Nov. 22, 1966 G. P. RODGERS 3,287,706

ELECTRICAL DIGITAL DATA STORES

Filed Feb. 13, 1964 3 Sheets-Sheet 1

INVENTOR
GERALD PATRICK RODGERS
BY
ATTORNEYS

INVENTOR
Gerald Patrick Rodgers
BY
Kinzler, Kinzler & Ottinger
ATTORNEYS

Nov. 22, 1966 G. P. RODGERS 3,287,706

ELECTRICAL DIGITAL DATA STORES

Filed Feb. 13, 1964 3 Sheets-Sheet 3

INVENTOR
GERALD PATRICK RODGERS
BY
Kinzelstein, Kinzelstein & O'Neil
ATTORNEYS

United States Patent Office 3,287,706

Patented Nov. 22, 1966

3,287,706
ELECTRICAL DIGITAL DATA STORES

Gerald Patrick Rodgers, Seaton, England, assignor to The General Electric Company Limited, London, England Filed Feb. 13, 1964, Ser. No. 344,649
Claims priority, application Great Britain, Feb. 19, 1963, 6,653/63
14 Claims. (Cl. 340—173)

This invention relates to electrical digital data stores.

The invention is particularly concerned with electrical digital data stores of the kind in which the data stored at a storage location depends upon the inductive coupling between two conductors at that location and can be read by detecting the signal that is induced in one of these conductors in response to a current change in the other, the current change being brought about, for example, by alternating current or a pulse of direct current flowing in said other conductor.

Digital data stores of the kind specified above have been proposed in which the data stored at a storage location depends upon the presence or absence of magnetic screening between the two conductors of that location.

It is an object of the present invention to provide an improved electrical digital data store of the kind specified which does not make use of magnetic screening between the conductors of the storage locations.

According to the present invention, in an electrical digital data store a conductor configuration comprises a plurality of conductor loops at a plurality of storage locations respectively and a plurality of conductor elements that interconnect the conductor loops, each conductor loop being formed by a first conductor portion and a second conductor portion that are connected electrically in parallel between the interconnecting conductor elements that are connected thereto and each conductor loop having an electrical discontinuity in one of its first and second conductor portions in dependence upon the digit value stored at the particular storage location, and there are a plurality of further electrical conductors which are each associated with a different one of said conductor loops and of which parts are adjacent to but not in contact with parts of their associated loops, the arrangement being such that, during operation, in response to a current change in the conductor configuration, an electric signal which is characteristic of the value of digit stored at each storage location is induced in each of the further conductors.

In one embodiment of electrical digital data store in accordance with the present invention, the conductor elements and said first conductor portions of the conductor loops are all constituted by a single elongated conductor of the conductor configuration, the said second conductor portions extend from this elongated conductor and said parts of the conductor loops are provided by said second conductor portions, the arrangement being such that, during operation, in response to a current change in the conductor configuration, electric signals which are relatively large and small in magnitude are induced in the further conductors associated with loops of that configuration which have discontinuities respectively in their first and second conductor portions.

In another embodiment of electrical digital data store that is in accordance with the present invention, the said parts of the conductor loops are each provided partly by the first conductor portion and partly by the second conductor portion of each loop, the arrangement being such that, during operation, in response to a current change in the conductor configuration, a voltage of one polarity is induced in each of the further conductors that are associated with conductor loops having discontinuities in their first conductor portions and a voltage of the opposite polarity is induced in each of the further conductors that are associated with conductor loops having discontinuities in their second conductor portions.

Preferably each said further conductor has two parts which are adjacent to but not in contact with two parts respectively of the associated conductor loop of the conductor configuration and which are interconnected electrically so that individual electric signals induced therein, during operation, in response to a current change in the conductor configuration combine additively.

In a preferred arrangement, each loop of the conductor configuration is of generally rectangular form and has sides that are long relative to the distance between them, and the said parts of the conductor loops comprise these long sides of the loops.

The conductor configuration may be provided by printed circuit conductors. (The term "printed circuit conductors" used herein refers to electrical conductors formed as a metallic pattern on an electrically insulating substrate, and it is not intended that this term be limited to the case in which the metallic pattern is obtained by an actual printing process.)

The further conductors may comprise printed circuit conductors which may be all formed on a common electrically insulating substrate.

The conductor configuration and/or the said further conductors may have a thin coating of electrical insulating material, for example, shellac, on at least the surfaces of one thereof that are adjacent to surfaces of the other, the parts of the conductor configuration and of said further conductors that are side-by-side being separated substantially only by this insulating material.

It may be arranged that said conductor configuration is removable to facilitate its replacement with a corresponding conductor configuration in which the electrical discontinuities characterise a different combination of digit values.

There may be at least one further conductor configuration which corresponds to the first said configuration and in which the electrical discontinuities characterise a predetermined combination of digit values, some, if not all of the further conductors being each associated in like manner with a different one of the conductor loops of each conductor configuration.

Two examples of electrical binary digital data stores in accordance with the present invention will now be described with reference to the three figures of the accompanying drawings in which.

Figure 1:
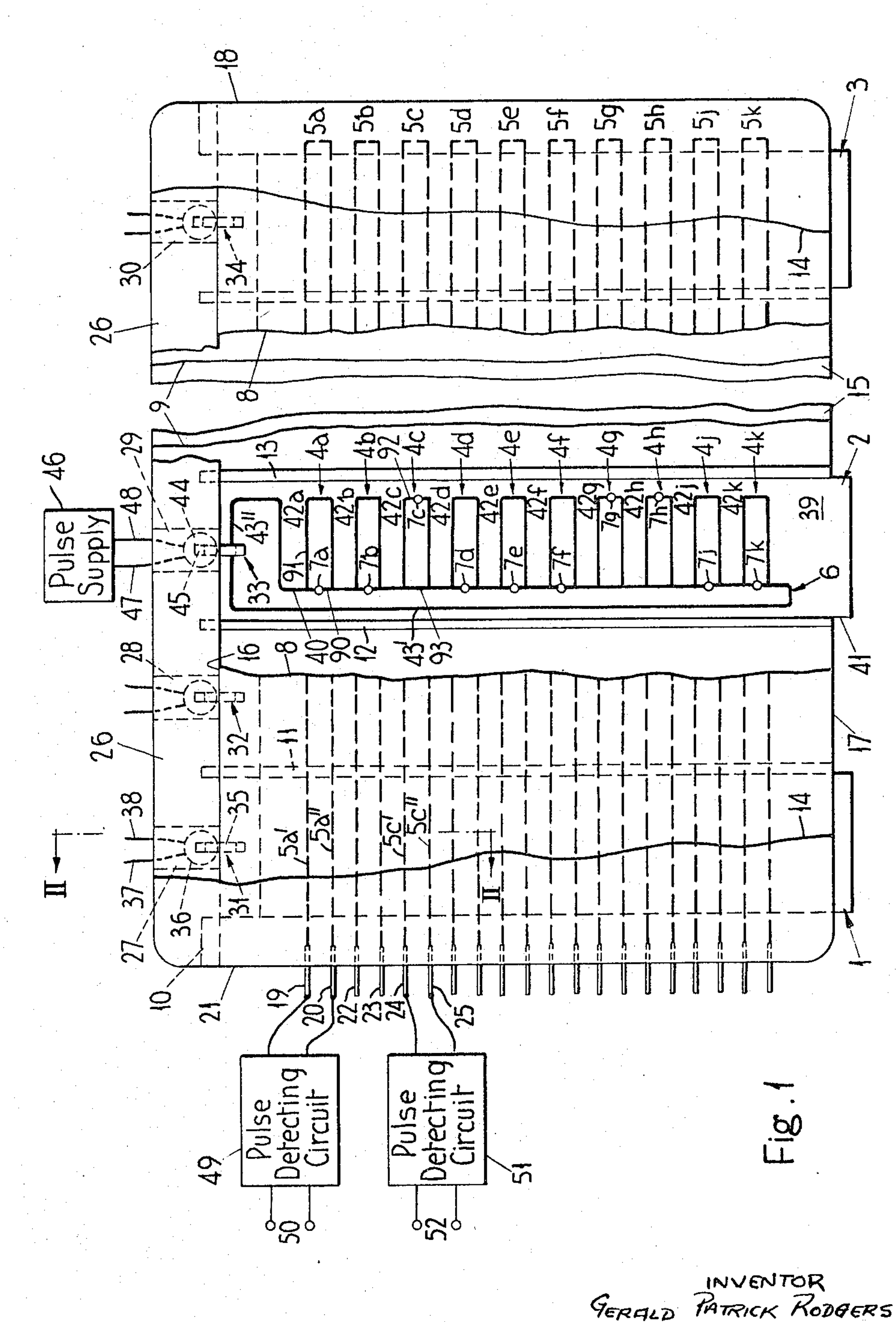
FIGURE 1 shows a partly cut away plan view of the first example of data store.

Referring to FIGURE 1, the first example of data store has a plurality of "word" stores of which only the "word" stores 1, 2 and 3 are shown and which each comprises ten storage locations, such as the storage locations 4 of the "word" store 2, that are each for storing a binary digit that is of different and predetermined significance in a binary word stored by its "word" store. There are a plurality of "read" conductors 5 each of which is associated with a different one of the storage locations 4 and the like in each "word" store 1, 2, 3 and the like. The storage locations thus associated with any particular one of the "read" conductors 5 are those which are for storing binary digits having the same significance in binary words stored by the "word" stores.

Each "word" store, for example, the word store 2 has a conductor configuration 6 which extends through all its storage locations 4 and which has an electrical discontinuity 7 at each storage location. By means of these electrical discontinuities 7 it is arranged, as will be hereinafter described, that a predetermined one of two appreciably different degrees of inductive coupling is obtained at each storage location 4 between the appertaining conductor configuration 6 and the associated one of the "read" conductors 5. The information in the "word" store 2 can be read by detecting the magnitudes of the signals induced in the "read" conductors 5 when a current change is produced in the conductor configuration 6 of that store.

The data store comprises an assembly wherein two generally rectangular plates 8 and 9 of electrical insulating material are held at a substantially uniform spacing by strips 10, 11, 12, 13 and the like of electrical insulating material and are mounted between two sheets 14 and 15 of copper which provide magnetic screening. The "read" conductors 5 are provided by printed circuit conductors on the surface of the plate 8 that is adjacent to the plate 9. The exposed surfaces of these conductors 5 are coated with a thin layer of electrical insulating material such as shellac.

Each of the "read" conductors 5, for example, the read conductor that is referenced 5_a_ has two parts 5_a'_ and 5_a''_ which are parallel to one another and to the sides 16 and 17 of the plate 8, and which are interconnected electrically adjacent to one end 18 of the plate 8. A pair of output terminals 19 and 20 of the data store that are carried by the plate 8 at its other end 21 are connected to these two parts 5_a'_ and 5_a''_ respectively of the read conductor 5_a_. Further pairs of output terminals 22, 23; 24, 25 and the like of the data store are similarly associated with the other "read" conductors 5_b_ to 5_k_ respectively. The two parts 5' and 5'' of each "read" conductor 5 thus provide forward and return legs respectively.

The strips 10 and 13 which maintain the spacing between the plates 8 and 9 are parallel to one another and to the ends 18 and 21 of the plate 8. Thus the plates 8 and 9 and the strips 10 to 13 define a plurality of channels which extend transversely of the parts 5' and 5'' of the "read" conductors 5 and which accommodate the plurality of "word" stores 1, 2, 3 respectively. A stop member 26 of electrical insulating material is attached to one side of the plate 9 so that it is across one end of each channel. This end of each channel thus is closed apart from a small aperture provided by a slot 27, 28, 29 or 30 cut across the stop member 26.

An electromagnetic coupling device 31, 32, 33 or 34 is provided at the closed end of each channel. Each of these coupling devices 31 to 34 is identical and, as can be seen in more detail in FIGURE 2, the coupling device 31, for example, comprises a member 35 of ferromagnetic material on which is wound an energising winding 36 and which is shaped generally in the form of a ring and so that there is a gap between its ends. The width of this gap is generally equal to the distance between the plates 8 and 9 and the ferromagnetic member 35 is mounted on the plate 9 so that its two end faces are substantially in alignment with the adjacent surfaces respectively of the plates 8 and 9. Part of the member 35 and the energising winding 36 are accommodated within the associated slot 27 in the member 26. Electrical connections to this winding 36 are provided by a pair of input conductors 37 and 38 of the data store.

In each of the "word" stores, for example, the word store 2, the conductor configuration 6 is provided by printed circuit conductors on a long narrow strip 39 of electrical insulating material which is dimensioned so as to be a sliding fit in any one of the channels that are defined by the plates 8 and 9 and the spacing strips 10 to 13 and so as to be slightly longer than these channels.

This enables the removal and replacement of the "word" store 2. The exposed surfaces of these printed circuit conductors are coated with a thin layer of electrical insulating material such as shellac. The conductor configuration 6, like the conductor configuration (not shown) of every other "word" store 1, 3 comprises an elongated conductor 40 which lies in the length of and adjacent to one edge 41 of its supporting strip 39 of insulating material and which provides one short side of each of ten narrow rectangular conductor loops 42 at the ten storage locations 4 respectively. The ends of the elongated conductor 40 are joined through a conductor 43 of which a part 43' lies along the edge 41 of the supporting strip 39 and another part 43'' lies across one end of this strip.

The electrical discontinuities 7 are the result of holes drilled through the printed circuit conductors and their supporting strip 39 of insulating material. Each discontinuity 7 is in one or other of the two short sides of a different one of the conductor loops 42. For example, the conductor loop 42 has the discontinuity 7_a_ in the short side 90 thereof that is provided by the conductor 40. Consequently the only electrical continuity through the portion of the conductor configuration 6 having the loop 42_a_ is through the portion 91 of this loop which comprises its other three sides and which is connected in parallel with the short side 90. The conductor loop 42_c_, for example, has the discontinuity 7_c_ in the other short side 92 thereof so that the only electrical continuity through this portion of the conductor configuration is via the short side 93 of the loop 42_c_ that is provided by the conductor 40.

The "word" store 2, like the other "word" stores 1, 3 of the data store, has been pushed into its associated channel so that the end of its supporting strip 39 that has the conductor part 43'' is abutting the stop member 26. The conductor configuration 6 is such that in this position each conductor loop 42 has its long sides parallel to and immediately facing the two parts 5' and 5'' respectively of a different one of the "read" conductors 5, engagement between the insulating coatings of shellac on the two sets of conductors 5 and 6 just being avoided. Also, the conductor part 43'' is just on the inward side of the gap between the ends of the ferromagnetic member 44 associated with this channel. In this connection, it has been found that the inductive coupling through the ferromagnetic member 44 to the conductor configuration can be improved by having the conductor part 43'' in this position rather than between the ends of this member.

When it is required to read out the information stored in any one of the "word" stores, for example the "word" store 2 a pulse of direct current is supplied to the energising winding 45 of the coupling device 33 associated with this "word" store. This pulse is provided by a suitable pulse supply 46 connected to the winding 45 by the pair of input conductors 47 and 48 of the data store that are associated with the word store 2. As the result of this pulse, a corresponding current pulse is induced in the conductor configuration 6. At the storage location 4_a_, for example, this pulse flows round the portion 91 of the loop 42_a_ so that the current changes corresponding to the incidence and termination of the pulse each cause aiding voltages to be induced in the two parts 5_a'_ and 5_a''_ of the associated "read" conductor 5_a_ and an electric current pulse of one sense followed by an electric current pulse of the opposite sense flow through this conductor. One or both of these pulses are detected by a suitable pulse detecting circuit 49 which is connected to the output terminals 19 and 20 of this "read" conductor 5_a_ and which then supplies to its output circuit 50 an electric signal signifying a predetermined one of the binary values "0" and "1" for the digit stored at the storage location 4_a_.

At the storage location 4_c_, for example, the pulse induced in the conductor configuration 6 flows through the short side 93 of the conductor loop 42_c_ that is provided by the elongated conductor 40. Because this side 93 of the loop 42c is perpendicular to the two parts 5c′ and 5c″ of the associated "read" conductor 5c there is substantially no inductive coupling and hence substantially no electric signal induced in this "read" conductor. Therefore the pulse detecting circuit 51 which is connected to the output terminals 24 and 25 of the "read" conductor 5c does not supply an electric signal to its output circuit 52, this state of affairs signifying that the other one of the said binary digit values is stored at the storage location 4c.

In the above manner the binary digit values of the binary word stored in the chosen "word" store 2 of the data store are signified at the output circuits 50, 52 and the like of ten pulse detecting circuits which are connected to the ten "read" conductors 5 respectively and of which only the detecting circuits 49 and 51 are shown.

Figure 3:
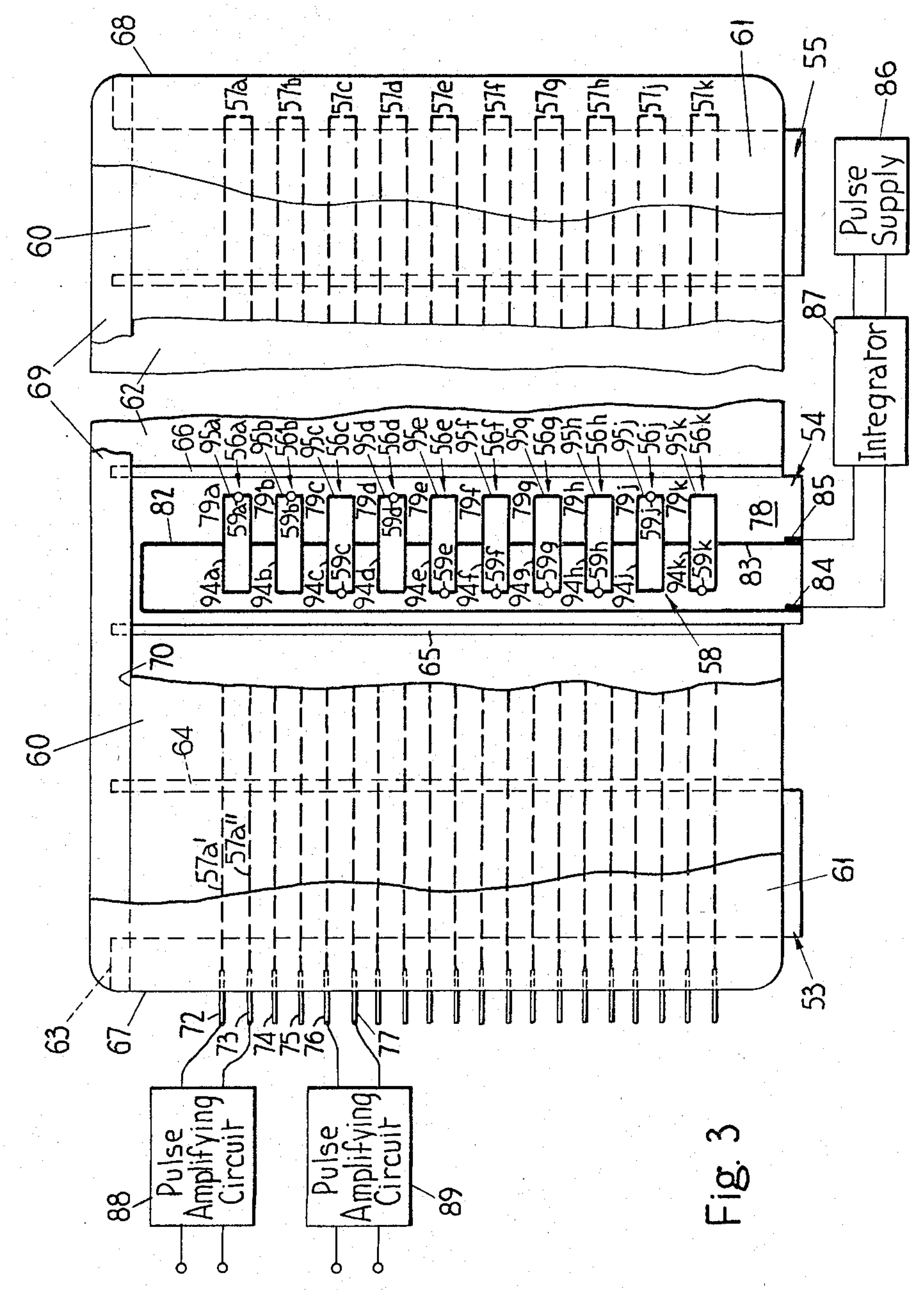
FIGURE 3 shows a partly cut away plan view of the second example of data store.

Referring to FIGURE 3, the second example of data store has a plurality of "word" stores of which only the "word" stores 53, 54 and 55 are shown and which each comprises ten storage locations, such as the storage locations 56 of the "word" store 54, that are each for storing a binary digit that is of different and predetermined significance in a binary word stored by its word store. There are a plurality of "read" conductors 57 each of which is associated with a different one of the storage locations 56 and the like in each "word" store 53, 54, 55 and the like. The storage locations thus associated with any particular one of the "read" conductors 57 are those which are for storing binnary digits having the same significance in binary words stored by the "word" stores.

Each "word" store, for example the "word" store 54 has a conductor configuration 58 which extends through all its storage locations 56 and which has an electrical discontinuity 59 at each storage location. By means of these electrical discontinuities 59 it is arranged, as will be hereinafter described, that a predetermined one of the two opposite senses of inductive coupling is obtained at each storage location 56 between the appertaining conductor configuration 58 and the associated one of the "read" conductors 57. The information in the word store 54 can be read by detecting the polarities of the signals induced in the "read" conductors 57 when a current change is produced in the conductor configuration 58 of that store.

The data store comprises an assembly in which a plate 60 of electrical insulating material is mounted between two copper sheets 61 and 62 which provide magnetic screening. The copper sheet 61 is in contact with and may be bonded to one surface of the plate 60. The "read" conductors 57 are provided by printed circuit conductors on the opposite surface of the plate 60 and have their exposed surfaces coated with a thin layer of electrical insulating material such as shellac. Spacings strips 63, 64, 65, 66 and the like of electrical insulating material are situated between the latter surface of the plate 60 and the copper sheet 62 and keep this plate and this sheet at a substantially uniform spacing. The spacing strips 63 to 66 are parallel to one another and to the ends 67 and 68 of the plate 60 and the plurality of "word" stores 53, 54, 55 are accommodated in a plurality of channels respectively formed by these strips, the plate 60 and the copper sheet 62. These channels are all closed at one end by a member 69 of electrical insulating material.

Figure 2:
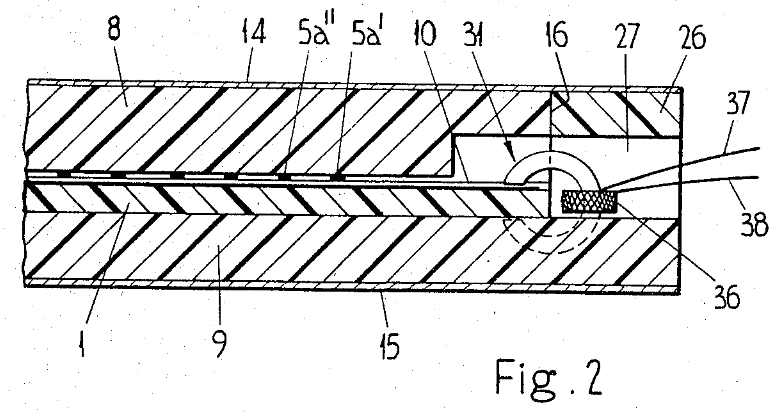
FIGURE 2 shows to a larger scale a section on the line II—II of FIGURE 1.

The "read" conductors 57 are identical with the read conductors 5 of the first example of data store shown in FIGURES 1 and 2. Thus each "read" conductor, for example, the read conductor that is referenced 57a has two parts 57a′ and 57a″ which are parallel to one another and to the sides 70 and 71 of the plate 60 and which are interconnected electrically adjacent to the end 68 of this plate. A pair of output terminals 72 and 73 of the data store that are carried by the plate 60 at its other end 67 are connected to these two parts 57a′ and 57a″ respectively of the read conductor 57a. Further pairs of output terminals 74, 75; 76, 77 and the like of the data store are similarly associated with the other "read" conductors 57b to 57k respectively.

In each of the "word" stores, for example, the "word" store 54, the conductor configuration 58 is provided by printed circuit conductors on a long narrow strip 78 of electrical insulating material which is dimensioned to be a sliding fit in any one of the said channels formed by the plate 60, the copper sheet 62 and the spacing strips 63 to 66. This enables the removal and replacement of the "word" store 54. To assist in this the strip 78 is made slightly longer than these channels so that one end projects from the channel in which the "word" store 54 is accommodated. The exposed surfaces of these printed circuit conductors are coated with a thin layer of electrical insulating material such as shellac.

The conductor configuration 58, like the conductor configuration of every other "word" store 53, 55 comprises ten narrow rectangular conductor loops 79 of which the long and short sides are respectively parallel and perpendicular to the parts 57′ and 57″ of the "read" conductors 57. These conductor loops 79 are connected in series by conductor elements 80, 81 and the like which each join the mid point of one long side of a conductor loop to the mid point of the adjacent long side of the next conductor loop in the series. The long sides of the conductor loops 79a and 79k at the two ends of the series have their mid points joined by conductors 82 and 83 respectively to two input terminals 84 and 85 of the data store that are associated with the word store 54.

The electrical discontinuities 59 are the result of holes drilled through the printed circuit conductors and their supporting strip 78. Each discontinuity 59 is in one or other of the two short sides of a different one of the conductor loops 79. Consequently an electric current supplied to the conductor configuration 58 will flow through the half of each conductor loop 79 that is on the opposite side of the strip 78 to the discontinuity 59 in that loop.

The "word" store 54, like the other "word" stores 53, 55 of the data store, has been pushed into its associated channel so that its supporting strip 78 is abutting the member 69. The conductor configuration 58 is such that in this position each conductor loop 79 has its long sides immediately facing the two parts 57′ and 57″ respectively of a different one of the "read" conductors 57, engagement between the insulating coatings of shellac on these two sets of conductors 57 and 58 just being avoided.

During use of the data store, each pair of input terminals 84, 85 is connected to a pulse supply via an integrating network and each pair of output terminals 72, 73; 74, 75 and 76, 77 is connected to a pulse amplifying circuit. In FIGURE 3 only the pulse supply 86 and integrating network 87 associated with the input terminals 84 and 85, and the pulse amplifying circuits 88 and 89 associated with the output terminals 72, 73 and 76, 77 are shown.

When it is required to read out the information stored in any one of the "word" stores, for example, the "word" store 54 the pulse supply 86 is caused to supply a pulse of direct current. This pulse is integrated by the integrating network 87 and the resulting current signal is supplied to the conductor configuration 78. This current signal flows through one of the two halves of each conductor loop 79 that is determined by the position of the discontinuity 59 in that loop and voltages are induced in the "read" conductors 57 that have instantaneous values which are proportional to the rate of change of the current signal in the conductor configuration. The polarity of each of these voltages depends upon which half of the appertaining conductor loop 79 carries the current signal in the conductor configuration.

Inasmuch as the voltage induced in any one of the conductor loops 79 is a function of the differential of the current signals supplied to the conductor configuration 58 and this current signal is a function of the integral of the direct current pulse supplied by the pulse supply 86 it will be appreciated that this voltage has substantially the same waveform as the corresponding direct current pulse. In other words, in response to the direct current pulse supplied by the pulse supply 86, voltage pulses are induced in the read conductors 57 and are amplified by the amplifying circuits 88, 89 and the like. The voltage pulses induced in the read conductors 57*a*, 57*b*, 57*d* and 57*j* all have one polarity which signifies a predetermined one of the binary values "0" and "1" for the digits stored at the storage locations 56*a*, 56*b*, 56*d* and 56*j*. The voltage pulses induced in the read conductors 57*c*, 57*e*, 57*f*, 57*g*, 57*h* and 57*k* all have the other polarity which signifies that the other one of the said binary digit values is stored at each of the storage locations 56*c*, 56*e*, 56*f*, 56*g* and 56*k*.

It will be appreciated that the same result is obtained if, instead of integrating the direct current pulse provided by the pulse supply 86, this pulse is supplied directly to the conductor configuration 58 and the resulting signals induced in the read conductors 57 are integrated before being applied to the amplifying circuits 88, 89 and the like.

The two methods of supplying current signals to the conductor configurations of the two examples of data store described above are interchangeable. Thus in the first example of data store (FIGURES 1 and 2) the coupling devices 31 to 36 could be replaced by direct connections and in the second example of data store (FIGURE 3) the direct connections could be replaced by coupling devices (not shown) similar to the coupling devices 31 to 36. In each case it would be necessary to modify the conductor configurations 6 and 58 in obvious manner, to suit the changed method of supply.

It will be appreciated that with each of the data stores described above, only the binary word in one "word" store 1, 2, 3, 53, 54 or 55 can be read at a time. If the facility of reading simultaneously the binary words in several "word" stores is required each "word" store must be provided with an individual set of "read" conductors. In one construction of binary digital data store (not shown) which provides this facility a plurality of "word" stores (not shown) which each correspond to any one of the "word" stores 1, 2, 3 in the first example described above are arranged not side-by-side with a common set of "read" conductors 5 as in this example, but in a stack one above the other with individual sets of "read" conductors (not shown).

What is claimed is:

1. An electrical digital data store having an input conductor configuration which is for carrying interrogating current pulses and which contains at least two alined conductor elements with first and second conductor portions each extending between adjacent ends of these elements to provide a binary digit storage location, a conductor path containing two adjacent spaced conductor strips connected in series in such manner that current flowing in one direction in one strip flows in the opposite direction in the other strip, and mounting means which carries said conductor path and on which said conductor configuration is mounted with the two end parts of said first conductor portion alongside but not in contact with said two conductor strips respectively whereby an interrogating current pulse flowing through said first conductor portion induces two aiding voltages in said conductor path, there being an electrical discontinuity in one of said first and second conductor portions in dependence upon the binary digit value stored at said storage location whereby an interrogating current pulse supplied to the conductor configuration is directed through the other one of these conductor portions.

2. An electrical digital data store according to claim 1 wherein said end parts of said first conductor portion are generally perpendicular to said conductor elements and wherein said second conductor portion is in alinement with said conductor elements.

3. An electrical digital data store according to claim 1 wherein there are means to supply an interrogating current pulse to said conductor configuration and means connected to said conductor path to detect the occurrence of voltages induced in said conductor path by said interrogating current pulse.

4. An electrical digital data store according to claim 1 wherein the conductor configuration comprises printed circuit conductors.

5. An electrical digital data store according to claim 4 wherein there is a member of electrical insulating material and wherein said conductor path comprises a printed circuit conductor which is formed on a surface of this member.

6. An electrical digital data store according to claim 5 wherein a strip of electrical insulating material has said conductor configuration formed on one surface thereof and wherein said mounting means comprises said member, a further member adjacent to the surface of said member that has the conductor path thereon, spacers between the two said members to maintain these members at a predetermined spacing and to form with these members an elongated aperture in which said strip is a sliding fit, and a stop member at one end of the aperture to predetermine the position of said strip within that aperture, the strip being accommodated within said aperture with the conductor configuration adjacent to the conductor path and with an end thereof abutting said stop member.

7. An electrical digital data store according to claim 6 wherein there are an energizing winding and a ferromagnetic member which is coupled electromagnetically with that winding and with said conductor configuration to induce an interrogating current in that configuration when a corresponding current is supplied to said winding.

8. An electrical digital data store according to claim 7 wherein said ferromagnetic member is carried by said mounting means at the same end of said aperture as said stop member and has two pole faces which are adjacent to but not in contact with the surface of said strip that has the conductor configuration thereon and the opposite surface of that strip respectively.

9. An electrical digital data store having an input conductor configuration which is for carrying interrogating current pulses and which contains at least two alined conductor elements with first and second conductor portions each extending between adjacent ends of these elements and offset on opposite sides of these elements to provide a binary digit storage location, a conductor path containing two adjacent spaced conductor strips connected in series in such manner that current flowing in one direction in one strip flows in the opposite direction in the other strip, mounting means which carries said conductor path and on which said conductor configuration is mounted with two end parts of said first conductor portion alongside but not in contact with said two conductor strips respectively whereby an interrogating current pulse flowing through said first conductor portion induces two aiding voltages of one polarity in said conductor path and with the two end parts of said second conductor portion alongside but not in contact with said two conductor strips respectively whereby an interrogating current pulse flowing through said second conductor portion induces two aiding voltages of the other polarity in said conductor path, there being an electrical discontinuity in one of said first and second conductor portions in dependence upon the binary digit value stored at said storage location whereby an interrogating current pulse supplied to the conductor configuration is directed through the other one of these conductor portions.

10. An electrical digital data store according to claim 9 wherein said end parts of said first and second conductor portions are all generally perpendicular to said conductor elements.

11. An electrical digital data store according to claim 9 wherein there are means to supply an interrogating current pulse to said conductor configuration and means connected to said conductor path to supply a signal signifying one binary value in response to voltages of one polarity in said conductor path and to supply a signal signifying the other binary value in response to voltages of the other polarity in said conductor path.

12. An electrical digital data store comprising an input member containing at least one conductive strip, said strip comprising an elongated conductor for normally conducting current along a linear path and a plurality of conductor portions electrically in shunt with a plurality of parts respectively of said conductor each for changing the direction of the conductive path through said conductive strip upon physical removal of a portion of the associated part of said conductor and a plurality of non-magnetic output members having parts extending alongside parts of said conductor portions to detect by electric induction the flow of current through said conductor portions.

13. An electrical binary word store comprising an input conductor configuration containing a plurality of alined conductor elements and a plurality of separate pairs of conductor portions, the conductor portions of a different one of said pairs extending in parallel electrically between the adjacent ends of each two adjacent conductor elements, at least one conductor portion of each pair being offset from the line of said conductor elements and the conductive path through said conductor configuration being selectively routed by removal of part of one of the conductor portions of each pair; a plurality of output conductors each associated with a different one of said pairs of said conductor portions; and means to mount the conductor configuration with two parts of one conductor portion of each pair adjacent to, but not in contact with, two parts respectively of the associated output conductor whereby an interrogating current pulse flowing through this one conductor portion of any pair induces two aiding voltages in the associated output conductor.

14. An electrical digital data store comprising a plurality of binary word stores each according to claim 13 wherein the same output conductors are common to every binary word store.

References Cited by the Examiner

UNITED STATES PATENTS

| | | | |
|---|---|---|---|
| 3,011,156 | 11/1961 | MacPherson | 340—173 |
| 3,038,105 | 6/1962 | Brownfield | 317—101 |
| 3,061,821 | 10/1962 | Gribble | 340—174 |
| 3,069,665 | 12/1962 | Bobeck | 340—174 |
| 3,130,388 | 4/1964 | Renard | 340—173 |
| 3,171,100 | 2/1965 | Rajchman | 340—173 |

TERRELL W. FEARS, *Acting Primary Examiner.*

IRVING SRAGOW, BERNARD KONICK, *Examiners.*

R. G. LITTON, *Assistant Examiner.*